United States Patent [19]

Chisaka et al.

[11] Patent Number: 4,628,764
[45] Date of Patent: Dec. 16, 1986

[54] DEVICE FOR DRIVING A MOVABLE MEMBER IN VEHICLE

[75] Inventors: Kazuto Chisaka, Musashino; Masagoro Kushida, Atsugi; Yoshiro Nagayama, Isehara; Masami Yamamoto, Machida, all of Japan

[73] Assignees: Honda Giken Kogyo Kabushiki Kaisha; Ichikoh Industries Limited, both of Tokyo, Japan

[21] Appl. No.: 774,480

[22] Filed: Sep. 10, 1985

[30] Foreign Application Priority Data

Sep. 13, 1984 [JP] Japan .............................. 59-190513

[51] Int. Cl.⁴ .............................................. F16H 57/00
[52] U.S. Cl. ....................................... 74/625; 74/421 A
[58] Field of Search ............... 74/625, 421 A, 421 R, 74/506

[56] References Cited

U.S. PATENT DOCUMENTS

| | | | |
|---|---|---|---|
| 2,724,289 | 11/1955 | Wight | 74/625 |
| 3,070,687 | 12/1962 | Marchant | 74/625 X |
| 3,491,615 | 1/1970 | Hutchinson et al. | 74/625 |
| 3,572,163 | 3/1971 | Clark | 74/625 |
| 4,085,629 | 4/1978 | Fogarollo | 74/506 X |
| 4,137,796 | 2/1979 | Bostrom | 74/625 |
| 4,580,463 | 4/1986 | Allouche et al. | 74/625 |

*Primary Examiner*—Dennis L. Taylor
*Attorney, Agent, or Firm*—Gerald J. Ferguson, Jr.; James E. Bryan; Michael P. Hoffman

[57] ABSTRACT

A device for driving a movable member in vehicle comprises a driving motor provided to be rotated in s predetermined direction, a reduction gear train for decelerating the rotating motion of the driving motor, and crank mechanism for transmitting the rotation of the motor to an output shaft to be coupled with a driven member and a casing for enclosing the motor, reduction gear train and the crank mechanism.

Adjacent two gears in the reduction gear train are rotatably supported coaxially to the casing, and both gears are disposed relatively movably in the axial direction. The two gears are coupled through a clutch mechanism to integrally rotates, disengaged by a manual operating member as required, and only the gear near the output shaft can be rotated.

10 Claims, 9 Drawing Figures

DEVICE FOR DRIVING A MOVABLE MEMBER IN VEHICLE

BACKGROUND OF THE INVENTION (a) Field of the Invention

The present invention relates to a device for driving a movable member such as, for example, a retractable head lamp or a wiper unit in a vehicle and, more particularly, to a device for driving a movable member, which is capable of manual operation for maintenance.

(b) Related Art Statement

As a device for driving a movable member necessary to move from a first position to a second position or vice versa such as a retractable head lamp or a wiper unit in a vehicle there is a type for decelerating the rotation of a motor in a predetermined direction through a reduction gear train, further converting the rotation into a reciprocating motion via a crank mechanism and then moving the head lamp body or the wiper blades of the wiper unit between the first position and the second position via a linkage.

However, in case of maintenance for example exchanging a lamp bulb, it is impossible to dispose the body of the head lamp or the wiper blades of the wiper unit to a desired position. To this end, a driving device which has manual operating means for disposing the head lamp at the desired position for maintenance has been proposed. The driving device of this type is disclosed, for example, in Japanese unexamined Utility Model Publication No. 57-170666 published on Oct. 27, 1982. In this driving device, a clutch plate is mounted on a rotational shaft of a motor at the side with which a load including a reduction gear train is not coupled, and a manual operating handle having the other clutch plate engaged in one direction with the clutch plate is provided. Since the manual rotational is transmitted to the shaft when rotating the manual operating handle in the operating direction of the motor by these clutch plates in this driving device, the shaft of the motor can be rotated by rotating the manual operating handle even when the motor is disabled, thereby driving the head lamp through the reduction gear train and the crank mechanism. However, in the driving device of this type, the shaft of the motor is manually rotated via a one-way clutch, and even if the manual operating handle is rotated rapidly, the head lamp to be driven is driven at a ratio of reciprocal of the reduction gear ratio by the reduction gear train. Thus, this driving device has a problem that driving of the head lamp by manual operation is not rapidly performed.

BRIEF SUMMARY OF THE INVENTION

It is, therefore, an object of the present invention to provide a driving device which can manually drive a movable member in a vehicle and can also rapidly drive the movable member with a relatively small driving torque.

Another object of the present invention is to provide a driving device in which two reduction gears of a reduction gear train for transmitting the rotation of a motor to a output shaft to be connected with a linkage for rotating a movable member are coaxially disposed, the gears are coupled through a clutch mechanism and manual operating member for operating the clutch mechanism is disposed.

The above and other objects of the invention will be apparent by those skilled in the art from reading of the following detailed description of the disclosure found in the accompanying drawings and novelty thereof pointed out in the appended claims.

DETAILED DESCRIPTION OF THE PREFERRED EMBODIMENTS

Figure 1:
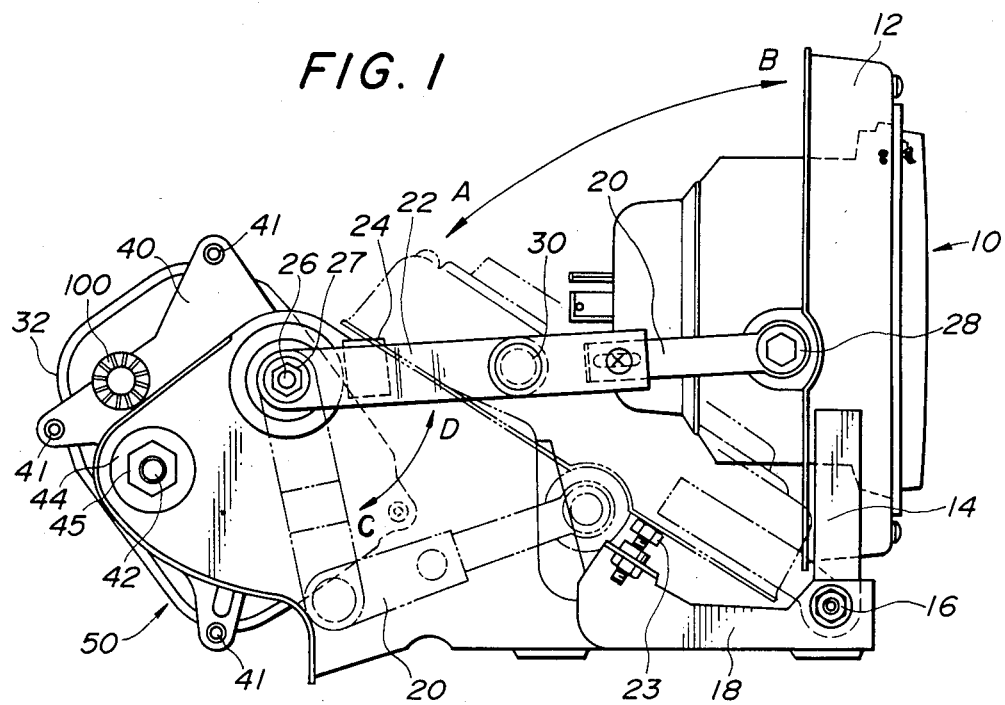
FIG. 1 is a schematic view showing an embodiment applied to a retractable head lamp with a driving device of the present invention.

As shown in the drawings and particularly in FIG. 1, numeral 10 entirely designates a retractable head lamp assembly to which the present invention is applied, and a lamp housing 12 is snugly mounted on a supporting member 14. The member 14 is disposed rotatably around a shaft 16 secured fixedly to a base 18. More particularly, the housing 12 is rotatable clockwise (A to B) or counterclockwise (B to A) at the shaft 16 as a center. One end of a first link 20 is mounted on the side of the housing 12 rotatably around a pin 28. The other end of the link 20 is coupled through a coupling pin 30 with the other end of a second link 22, to which one end of an output shaft of a driving device 50 to be described later is secured fixedly. The housing 12 is connected through the links 20 and 22 to the driving device 50, and rotates between a first position (an extended position) shown by solid lines and a second position (retracted position) shown by two-dotted lines at the shaft as a center. In other words, when the output shaft 26 of the driving device 50 is rotated clockwise at the first position, the link 22 rotates clockwise around the output shaft 26 as a center (in a direction of D to C), the link 20 coupled with the link 22 through a pin 30 rotates counterclockwise around the pin 28 as a center, and the housing 12 rotates from the first position to the second position (in a direction of B to A). Numeral 23 designates a stopper fixed to the base 18, and the back of the housing 12 makes contact with the stopper 23 to stop further rotating. On the other hand, when the shaft 26 of the driving device 50 rotates counterclockwise at the second position, the link 22 rotates in a direction of C to D, and the housing 12 returns to the first position. Numeral 24 designates a stopper fixedly secured to the base 18, and the stopper 24 makes contact with the side of the link 22 to stop further rotating. The driving device 50 for rotating the housing 12 has an enclosure 35 formed of a lower casing 32 and an upper casing 33, and a motor 60 as a driving source, a reduction gear train and a crank mechanism to be described later are contained in the enclosure 35. The entire enclosure 35 is fixed to a supporting plate 40 to be fixed to the base 18. In other words, through holes 39 for threaded bolts 38 are formed near at the four corners of the casings, respectively, while threaded holes 41 are formed at the positions corresponding to the holes 39 at the plate 40, and bolts 38 are engaged with the holes 41, respectively via the holes 39. A groove is formed on the surface of the lower casing 32 to be contacted with the upper casing 33 along the peripheral edge of the casing 32, a rubber packing 36 is disposed in the groove, and the enclosure 35 is sealed.

Figure 3:
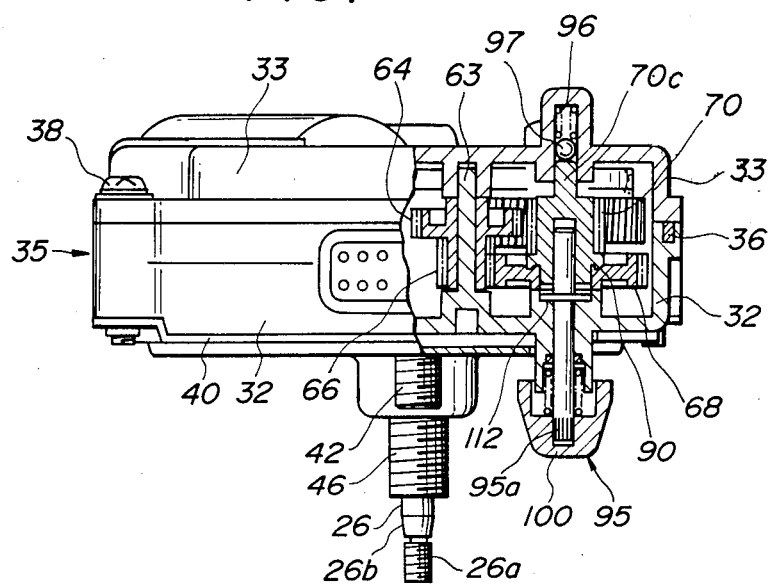
FIG. 3 is a side view partly in cross section.
Figure 5:
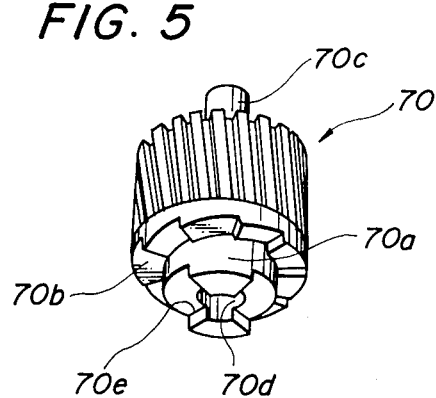
FIG. 5 is an enlarged perspective view of a gear formed with one claw of a clutch mechanism.
Figure 6:
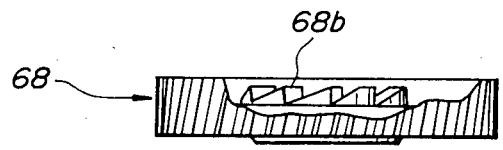
FIG. 6 is a side view partly in section of a gear formed with the other claw of the clutch mechanism.
Figure 4:
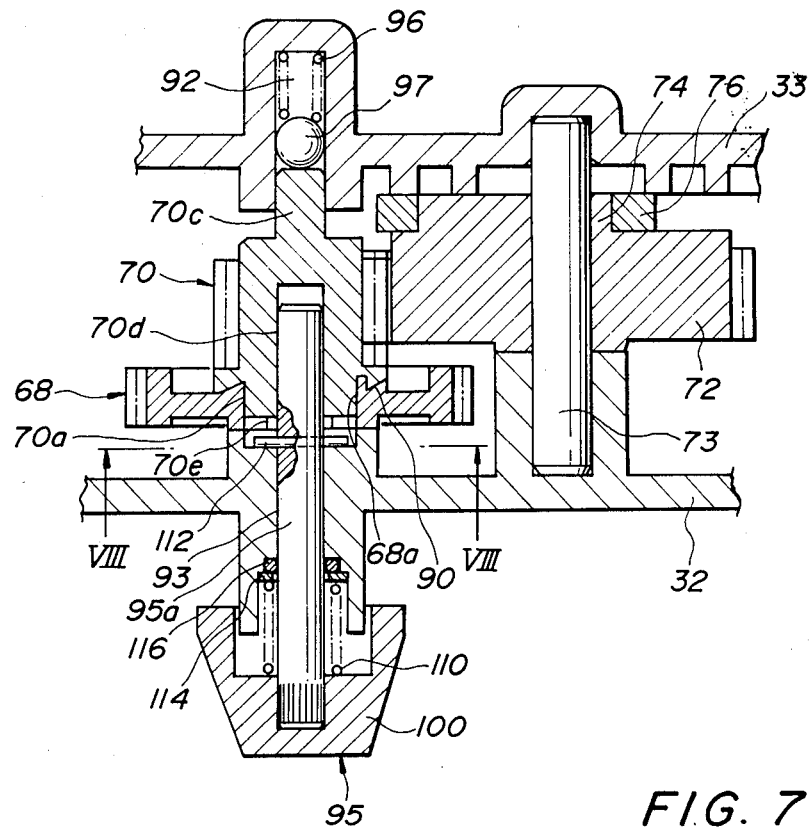
FIG. 4 is an enlarged sectional view of the essential portion showing the detail of a one-way clutch mechanism and a manual operating member in FIG. 3.
Figure 8:
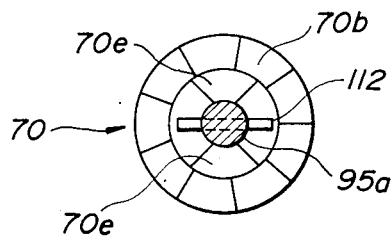
FIG. 8 is a view as seen from arrows of the lines VIII—VIII in FIG. 4.
Figure 7:
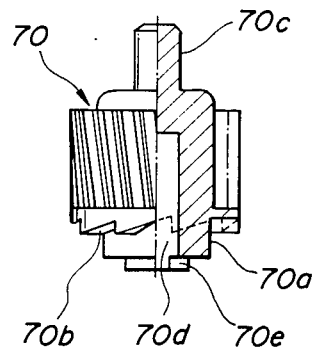
FIG. 7 is a side view partly in section of the gear shown in FIG. 5.

A threaded portion 42 which is projected toward the base 18 is formed at the plate 40, penetrates via the through hole formed at the base 18, and engaged with a nut 45 through a washer 44 from the opposite side of the base 18. Further, as shown in FIG. 3, a threaded cylindrical hollow portion 46 formed with threads on the outer periphery is formed on the plate 40 corresponding to the position where the output shaft 26 of the driving device 50 is projected from the lower casing 32 outside, and engaged with a nut (not shown) from the side of the base 18 via a through hole (not shown) formed at the base 18. The output shaft 26 of the driving device 50 is projected outside through the hollow portion of the threaded portion 46. The shaft 26 is formed with a threaded portion 26a at the end and also with a tapered portion 26b axially knurled. On the other hand, a hole (not shown) formed with a knurl on the inside to be fitted to the knurled portion formed on the output shaft 26 at one end of the the link 22, the taper 26b of the output shaft 26 is inserted into the hole, and a nut 27 is engaged from the link side with the threaded portion 26a of the output shaft 26. Thus, the link 22 is snugly secured at one end to the output shaft 26 of the driving device 50.

Figure 2:
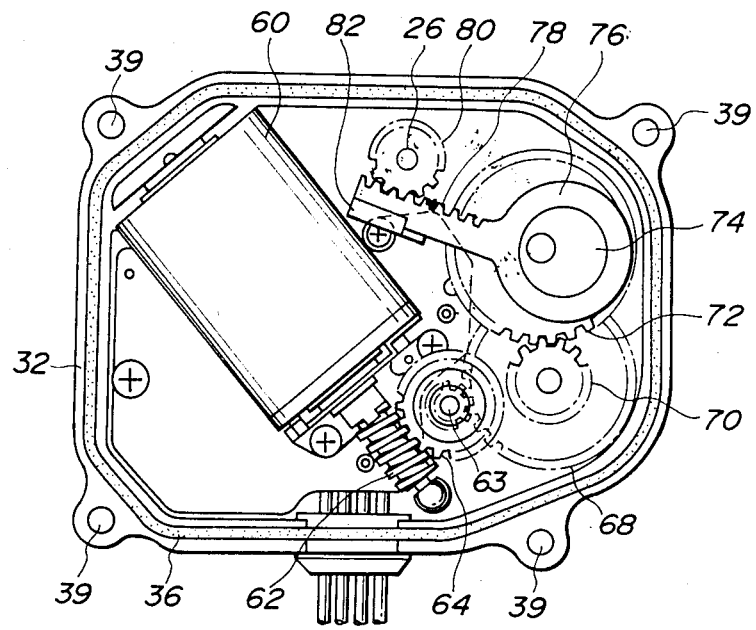
FIG. 2 is an enlarged plan view of the driving device in FIG. 1 in the state that the upper casing is removed.

In FIG. 2, a motor 60 as a driving source disposed in the lower casing 32 is shown. A worm 62 is fixed to the rotational shaft of the motor 60, and rotatably engaged in mesh with a worm wheel 64 rotatably engaged with a shaft 63 projected from the bottom wall of the casing 32. A gear 66 is formed coaxially with the worm wheel 64. The gear 66 is formed integrally with the worm wheel 64. A gear 68 is engaged with the gear 66. A gear 70 is arranged coaxially with the gear 68, and coupled through a one-way clutch mechanism as will be described later. A gear 72 is engaged with gear 70, rotatably engaged with a shaft 73 disposed between the lower casing 32 and the upper casing 33, and an eccentric shaft 74 is formed integrally with the gear 72. An eccentric bearing 76, i.e., a crank is rotatably engaged with the shaft 74, and a rack 78 is formed integrally with the portion extended from the bearing 76. A pinion gear 80 secured to the output shaft 26 is engaged with the rack 78. In order to reliably engaged the rack 78 with the pinion gear 80, a stopper 82 is mounted rotatably on the output shaft 26 for stopping the radial movement of the rack 78 with respect to the pinion gear 80. In the reduction gear arrangement described above, the rotation of the motor 60 in a predetermined direction is transmitted through the worm 62, the worm wheel 64 and the gear 66 to the gear 68, but since the gear 68 is arranged through the one-way clutch mechanism to transmit the rotation to the gear 70, it is further transmitted to the gear 72. The worm 62 and the worm wheel 64 construct a reduction gearing of the first stage, the gears 66 and 68 construct a reduction gearing of the second stage, and the gears 70 and 72 construct a reduction gearing of the third stage, and the reduction gear ratios are set to 1/24, 1/3.3 and 1/2.5, respectively. Therefore, when the worm 62 and hence the rotational shaft of the motor 60 rotates 198 revolutions, the gear 72 rotates one revolution. Since the shaft 74 is formed integrally with the gear 72, the rack 78 formed integrally with the bearing 76 reciprocates by the rotation of the shaft 74. The pinion gear 80 reciprocates by the reciprocating motion of the rack 78. Thus, the rotating motion of the motor 60 in the predetermined direction id decelerated by the reduction gear train to be converted into the reciprocating motion of the output shaft 26. Accordingly, it is understood that the lamp housing 12 is rotated from the first position to the second position or from the second position to the first position.

The driving device of the present invention comprises the manual operating member disposed coaxially with the gears 68 and 79 as intermediate reduction gears in the above-mentioned reduction gear train so that both are normally engaged to integrally rotate and disengaged to provide a rotational force only to the gear 70 as required. The driving device will be described in more detail.

The reduction gears 68 and 70 are separately constructed, and coupled through a one-way clutch mechanism 90. The gear 68 is formed in the shape of a spur gear, and a center hole 68a is formed to be engaged with the lower shaft portion 70a of the gear 70 at the center. When the lower shaft portion 70a of the gear 70 is engaged with the central hole 68a of the gear 68, a plurality of claws for forming the one-way clutch mechanism 90 are arranged on the surfaces of the both members to be contacted with one another. The claws 68b of the gear 68 side and the claws 70b of the gear 70 side are constructed to be engaged with the gear 70 only when the gear 68 rotates in one direction to transmit the rotation of the motor 60 to the output shaft 26. The gear 70 is formed in a cylindrical shape, and a gear portion to be engaged with gear 72 is formed on the peripheral surface. Further, an upper shaft portion 70c and a bearing hole 70d are formed at the portions along the axial center. The upper shaft portion 70c of the gear 70 is rotatably engaged with a bearing hole 92 formed in the casing 33, and the shaft portion 95a of the manual operating means 95 is engaged in the bearing hole 70d of the gear 70 in the state that the bearing hole 93 formed in the casing 32 is penetrated. Thus, the gear 70 is engaged with the central hole 68a of the gear 68 in the rotatably supported state. A coil spring 96 and a ball 97 are arranged in the bearing hole 92 formed in the casing 33 to apply an elastic force to the end of the upper shaft portion 70c of the gear 70 to press the gear 70 to the gear 68. On the other hand, a knob 100 is secured to the portion that the shaft portion 95a of the manual operating member 95 is projected outside of the housing 32, and the member 95 is constructed to press outwardly the casing 32 by the compression of the coil spring 110 between the knob 100 and the casing 32. Numeral 112 designates a pin secured to the shaft portion 95a of the member 95 normally pressed to the bottom wall of the casing 32 as a stopper for stopping the shaft portion 95a from removing from the bearing hole 93. Numeral 114 designates a washer, and numeral 116 designates a sealing O-ring. A pair of projections 70e are formed at the positions oppositely to the pin 112 at the lower ends of the gear 70 as described above. These projections 70e are formed in a sector shape of cross section, and projected at the positions along the opening end of the bearing hole 70d of the gear 70. The pin 112 is contacted with the lower end of the gear 70 through a pair of projections 70e by pressing the knob 100 of the pin 95 against the elastic force of the spring 110, and when further pressing the knob 100, the gear 70 is moved upwardly against the elastic force of the spring 96, and disengaged from the gear 68. When the knob 100 is rotated in a predetermined direction in this state, the pin 112 is engaged with the side walls of a pair of the projections 70e. Thus, the rotation of the knob 100 is transmitted to the gear 70, thereby rotating the output shaft 26 through the gear 72, the shaft 74, the bearing 76, the rack 78 and the pinio gear 80. When the gear 70 is rotated by 2.5 revolutions in case that the knob 100 of the member 95 is manually rotated, the gear 72 rotates one revolution. Accordingly, the pinion gear 80 can be rotated in one direction merely by rotating the gear 70 1.25 revolution, and the housing 12 can be rapidly moved from the first position (the second position) to the second position (the first position). When the member 95 is not operated, the gear 70 is pressed to the gear 68 by the elastic force of the spring 96, and both are snugly engaged via the claws 68b and 70b formed on the contacting surfaces of the both gears for forming one-way clutch mechanism 90. Thus, the rotation of the motor 60 in the predetermined direction can be transmitted through the reduction gear train to the output shaft 26, thereby reciprocating the output shaft 26. In this case, it is understood that since that shaft portion 95a of the member 95 is disengaged from the gear 70 to be engaged with the bearing hole 70d of the gear 70, it is not rotated. It would be understood from the property of the one-way clutch 90 that, when the knob 100 is lifted until contacting with the lower end of the gear 70 in which the pin 112 is interposed between a pair of the projection 70e and the knob 100 is rotated in a direction for transmitting the rotation of the motor 60 to the output shaft 26, the gears 68 and 70 engaged via the claws 68b and 70b are disengaged. In other words, the gear 70 is pressed on the gear 68 by the elastic force of the spring 96, but the claws 70b of the gear 70 move along the engaging surface of the claws 68b of the gear 68 by the rotation of the knob 100, and the gear 70 rotates while axially moving elevationally.

In the embodiment described above, the one-way clutch mechanism is arranged between the gear 68 and the gear 70. However, the gears 64 and 66 disposed at the positions near the driving motor 60 are separately formed, a plurality of claws for forming a one-way clutch are arranged on the opposed surfaces of the gears 64 and 66, one end of the shaft 63 is rotatably supported to the casing 33, the other end is extended to the outside of the casing 32, an operating knob may be secured to the extended end. In this case, the gear 66 is secured to the shaft 63, and a compression coil spring is provided between the gear 66 and the casing 32.

Figure 9:
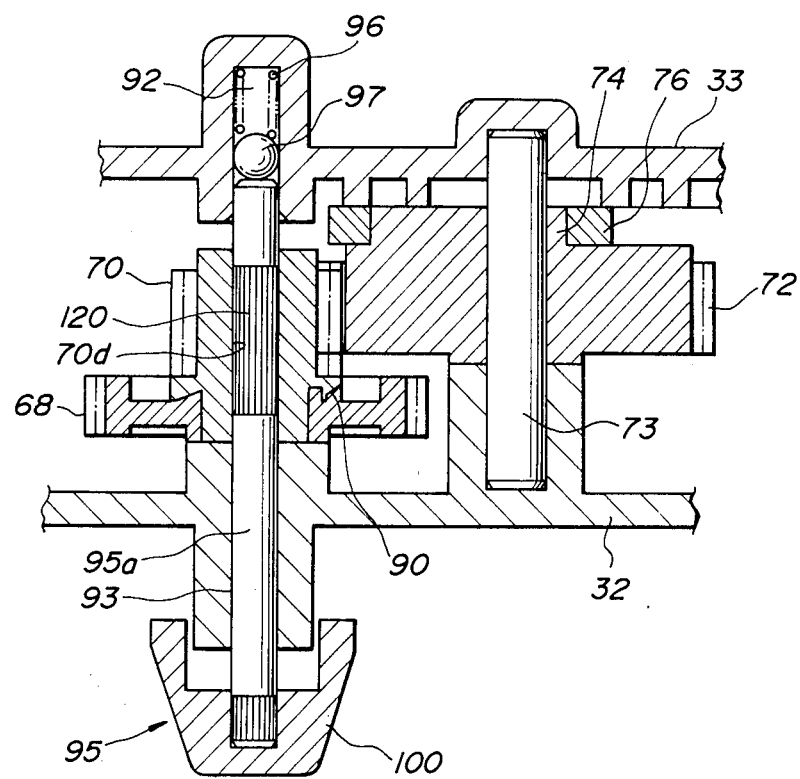
FIG. 9 is an enlarged sectional view of the essential portion showing another embodiment of the present invention corresponding to FIG. 4.

FIG. 9 shows an essential portion of a manual operating member in another embodiment of a driving device according to the present invention. In FIG. 9, the same reference numerals as those in the first embodiment designate the same or equivalent members or portions. It is understood from FIG. 9 that the shape of a gear 68 is the same as that in the first embodiment but the shape of a gear 70 is modified. The bearing hole 70d of the gear 70 is formed in a through hole, and a shaft portion 95a of a manual operation member 95 is penetrated fixedly through the hole 70d. A knob 100 is secured to one end of the shaft portion 95a, and the other end is pressed down through ball 97 by the elastic force of a coil spring 96 disposed in a hole 92 formed in the upper casing 33. Thus, claws 70b of the gear 70 are snugly engaged with the claws 68b of the gear 68, and the claws 70b and 68b construct a one-way clutch mechanism 90. The shaft portion 95a of the member 95 is rotatable with respect to the casing 32 and 33, and fixedly mounted on the gear 70 by forming a knurl 120 on the shaft portion 95a. Thus, when the motor 60 rotates in a predetermined direction, the member 95 rotates integrally with the gear 70. When the knob 100 is lifted from the state shown in FIG. 9 against the elastic force of the spring 96 in case that manually regulating the position of the head lamp, the one-way clutch mechanism 90 formed on the contacting surfaces between the gears 68 and 70 is disengaged, and the gears 68 and 70 are disconnected. When the knob 100 is rotated while holding the lifted state, the rotation of the gear 70 is transmitted to the gear 72, and the output shaft 26 is rotated through the eccentric shaft 74, the eccentric bearing 76, the rack 78 and the pinion 80 in the same manner as the first embodiment. Thus, the position of the head lamp can be regulated. In this embodiment, since the gear 70 is rotated in the state snugly secured to the shaft portion 95a of the member 95, the rotation of the knob 100 can be reliably transmitted to the gear 70.

In the embodiments described above, two gears of the reduction gear train are used to be coupled through the one-way clutch mechanism. The embodiments are not limited to the one-way clutch mechanism, but means for mechanically coupling the two gears is normally provided, and manual operating means for disengaging the coupling of the two gears by manual operation when the motor 60 is stopped and for rotating only the gear near the output shaft may be provided.

What is claimed is:

1. A device for driving a movable member in a vehicle having a driving motor provided to be rotated in a predetermined direction, a reduction gear train for decelerating the rotating motion of the driving motor, transmitting means for transmitting the rotating motion to an output shaft to be coupled with the driven member, and a casing for enclosing the driving motor and the transmitting means, comprising: two adjacent gears in said reduction gear train being arranged rototable with respect to said casing and coaxially with each other, first gear of said gears being coupled with a gear of front stage disposed at said driving motor side, second gear of said gears being coupled with a gear of next stage disposed at said output shaft side, said second gear arranged axially movably with respect to said first gear; coupling means arranged to integrally rotate said both gears for coupling said second gear with said first gear; and manual rotating means arranged in relation to said second gear for axially moving said second gear with respect to said first gear to disengaged the coupling of said gears, and for providing a rotational force to said second gear.

2. The driving device as claimed in claim 1, wherein said coupling means comprises claw members including a plurality of claw formed on the axially opposed surfaces of said first and second gears, and spring member arranged to apply an axial pressing force to said second gear, thereby engaging the claw members with each other and temporarily holding the engaged state.

3. The driving device as claimed in claim 2, wherein said second gear has a shaft portio rotatably supported to a bearing hole formed in the inner wall of said casing, said spring member has a compression coil spring arranged in said bearing hole and ball member for transmitting the elastic force of the coil spring to said shaft portion.

4. The driving device as claimed in claim 3, wherein said second gear has another shaft portion at the position opposite to the portion arranged with the shaft portion of said second gear, said first gear has a central hole through while the other shaft portion of said second gear passes in case that said second gear is pressed by said spring member, and said each claw member is arranged on the portion that said second gear is contacted with said first gear.

5. The driving device as claimed in claim 4, wherein a central hole is axially formed at the other shaft portion of said second gear, a pair of projections are formed to be axially projected at the position offset at 180° along the opening edge of said central hole, said manual rotating means is disposed at one end thereof rotatably within said central hole and at the other end thereof has an operating shaft extended to the outside of said casing, a manual operating knob secured to the extended end of said operating shaft, and a pin provided to penetrate through said operating shaft in a direction perpendicular to the axial direction corresponding to the position that one end of said operating shaft is disposed in the central hole of said second gear, when said knob is axially pressed, said pin lifts the other shaft portion of said second gear, thereby disconnecting said second gear from said first gear, and when further rotating, said pin is engaged with the side wall of said pair of projections to rotate said second gear.

6. The driving device as claimed in claim 4, wherein said each claw member has a one-way clutch mechanism formed to rotate integrally with said second gear only when said first gear is rotated in a predetermined direcion.

7. The driving device as claimed in claim 2, wherein said manual rotating means is secured to the through hole formed in said second gear, rotatably supported at one end thereof within the bearing hole formed in the inner wall of said casing, and has at the other end thereof an operating shaft portion extended outside through the wall opposed to said casing and an operating knob secured to the extended end of said operating shaft portion.

8. The driving device as claimed in claim 7, wherein said spring member has a compression coil spring arranged in said bearing hole and ball member for transmitting the elastic force of the compression coil spring to one end of said operating shaft portion.

9. The driving device as claimed in claim 8, wherein said each claw member has a one-way clutch mechanism formed to rotate integrally with said second gear only when said first gear rotates in a predetermined direction.

10. The driving device as claimed in claim 5, wherein said compression coil spring for providing pressing force toward the outside of said casing to said operating shaft is interposed between said casing and said manual operating knob.

* * * * *